US012627034B2

(12) United States Patent
Hou et al.

(10) Patent No.: US 12,627,034 B2
(45) Date of Patent: May 12, 2026

(54) BEAMFORMING ANTENNAS WITH OMNIDIRECTIONAL COVERAGE IN THE AZIMUTH PLANE

(71) Applicant: Outdoor Wireless Networks LLC, Claremont, NC (US)

(72) Inventors: XiaoHua Hou, Richardson, TX (US); Peter Bisiules, LaGrange Park, IL (US); Sammit Patel, Dallas, TX (US); Ligang Wu, Suzhou (CN); Haifeng Li, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 369 days.

(21) Appl. No.: 18/261,917

(22) PCT Filed: Jan. 25, 2022

(86) PCT No.: PCT/US2022/013591
§ 371 (c)(1),
(2) Date: Jul. 18, 2023

(87) PCT Pub. No.: WO2022/164761
PCT Pub. Date: Aug. 4, 2022

(65) Prior Publication Data

US 2024/0072420 A1 Feb. 29, 2024

(30) Foreign Application Priority Data

Feb. 1, 2021 (CN) ......................... 202110135752.9

(51) Int. Cl.
*H01Q 1/24* (2006.01)
*H01Q 15/14* (2006.01)
*H01Q 21/20* (2006.01)

(52) U.S. Cl.
CPC ............. *H01Q 1/246* (2013.01); *H01Q 15/14* (2013.01); *H01Q 21/205* (2013.01)

(58) Field of Classification Search
CPC .... H01Q 1/246; H01Q 15/14; H01Q 21/0006; H01Q 21/205; H01Q 25/001
See application file for complete search history.

(56) References Cited

U.S. PATENT DOCUMENTS 7,062,305 B1 * 6/2006 Cameron ............... G01C 15/06 342/357.29
2010/0253351 A1 10/2010 Huish et al.
(Continued)

FOREIGN PATENT DOCUMENTS

CN 207122170 U * 3/2018
KR 101540325 B1 * 7/2015 ............... H04Q 1/02
KR 101775456 B1 * 9/2017 ............. H01Q 21/06

OTHER PUBLICATIONS

C.B. Dietrich Jr., Adaptive Arrays and Diversity Antenna Configurations for Handheld Wireless Communication Terminals, Dissertation, Virginia Polytechnic Institute and State University, p. 29-52 (Year: 2000).*
(Continued)

*Primary Examiner* — Resha Desai
*Assistant Examiner* — Fred H Mull
(74) *Attorney, Agent, or Firm* — Myers Bigel, P.A.

(57) ABSTRACT

A base station antenna includes a plurality of pairs of RF ports, a tubular reflector, a plurality of columns of first frequency band radiating elements that are mounted to extend outwardly from the tubular reflector, the columns extending around a periphery of the tubular reflector and grouped into a plurality of column groups, where each column group includes at least three columns, and a plurality of feed networks, where each feed network connects one of
(Continued)

the pairs of RF ports to a respective one of the column groups.

14 Claims, 6 Drawing Sheets

(56) References Cited

U.S. PATENT DOCUMENTS

| | | | |
|---|---|---|---|
| 2017/0104274 | A1 | 4/2017 | Keniuk et al. |
| 2018/0287255 | A1* | 10/2018 | Zimmerman .......... H01Q 1/246 |
| 2018/0367199 | A1 | 12/2018 | Zimmerman |
| 2019/0028159 | A1* | 1/2019 | Bisiules ............... H01Q 21/205 |
| 2019/0103660 | A1* | 4/2019 | Zimmerman .......... H01Q 1/246 |
| 2020/0136689 | A1 | 4/2020 | Bisiules et al. |
| 2020/0328503 | A1 | 10/2020 | Li et al. |

OTHER PUBLICATIONS

J.A. Martinez et al., Cosecant-squared power pattern synthesis procedure for an Hour-Glass reflector antenna with sectorial beams, 2005 IEEE Antennas and Propagation Society International Symposium, p. 482-485 (Year: 2005).*

"International Search Report and Written Opinion corresponding to International Application No. PCT/US2022/013591 mailed Jun. 21, 2022".

* cited by examiner

BEAMFORMING ANTENNAS WITH OMNIDIRECTIONAL COVERAGE IN THE AZIMUTH PLANE

RELATED APPLICATION

The present application is a 35 U.S.C. § 371 national phase application of PCT Application PCT/US2022/013591, filed Jan. 25, 2022, which claims priority to Chinese Patent Application No. 202110135752.9, filed Feb. 1, 2021, the entire content of each of which is incorporated herein by reference.

FIELD

The present invention relates to cellular communications systems and, more particularly, to base station antennas that provide omnidirectional coverage in the azimuth plane.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 2-20 kilometers from the base station, although smaller cells are typically used in urban areas to increase capacity. The base station may include baseband equipment, radios and antennas that are configured to provide two-way radio frequency ("RF") communications with mobile subscribers that are positioned throughout the cell. In many cases, the cell may be divided into a plurality of "sectors," and separate base station antennas provide coverage to each of the sectors. The base station antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon. The base station antenna may include a small mechanical downtilt (e.g. 1-10°), and hence it will be appreciated that the columns generally extend vertically as opposed to always being exactly perpendicular to the plane defined by the horizon.

In order to increase capacity, cellular operators have, in recent years, been deploying base stations that provide coverage to smaller cells than conventional "macrocell" base stations. Base stations having reduced coverage areas are referred to using a variety of different names including small cell base stations, metrocell base stations, picocell base stations and the like. Herein, the term "small cell" will be used to refer to these smaller base stations and their associated antennas. Generally speaking, a small cell base station refers to a low-power base station that may operate in the licensed and/or unlicensed spectrum that has a much smaller range than a typical "macrocell" base station. A small cell base station may be designed to serve subscribers who are within short distances from the small cell base station (e.g., tens or hundreds of meters). Small cells may be used, for example, to provide cellular coverage to high traffic areas within a macrocell, which allows the macrocell base station to offload much or all of the traffic in the vicinity of the small cell to the small cell base station. Small cells may be particularly effective in Long Term Evolution ("LTE") cellular networks in efficiently using the available frequency spectrum to maximize network capacity at a reasonable cost. Small cell base stations typically employ an antenna that provides full 360 degree or "omnidirectional" coverage in the azimuth plane and a suitable beamwidth in the elevation plane to cover the designed area of the small cell.

With the introduction of various fourth generation ("4G") and fifth generation ("5G") cellular technologies, small cell base station antennas have been deployed that have multi-input-multi-output ("MIMO") capabilities. As known to those of skill in the art, MIMO refers to a technique where a baseband data stream is sub-divided into multiple sub-streams that are used to generate multiple RF signals that are transmitted through multiple different antenna arrays. The antenna arrays are, for example, spatially separated from one another and/or at orthogonal polarizations so that the transmitted RF signals will be sufficiently decorrelated. The multiple RF signals are recovered at the receiver and demodulated and decoded to recover the original data sub-streams, which are then recombined. The use of MIMO transmission techniques may help overcome the negative effects of multipath fading, and may be particularly effective in urban environments where reflections of the transmitted RF signals may increase the level of decorrelation between the transmitted RF signals.

FIG. 1A is a schematic diagram illustrating one conventional implementation of a small cell base station 10. As shown in FIG. 1A, the base station 10 includes three base station antennas 20-1, 20-2, 20-3 that are mounted on a raised structure (e.g., a light pole), with each antenna 20 pointing outwardly. Herein multiple like or similar elements may be labelled in the drawings using a two-part reference numeral. Such elements may be referred to herein individually by their full reference numeral (e.g., the antenna 20-2) and may be referred to collectively by the first part of their reference numeral (e.g., the antennas 20). In FIG. 1A, the radome of antenna 20-2 is omitted to schematically show two vertically-extending columns 24-1, 24-2 of radiating elements 26 that are included in each antenna 20.

FIG. 1B is a schematic diagram showing an "azimuth cut" of the three antenna beams 22-1, 22-2, 22-3 generated by the respective antennas 20-1, 20-2, 20-3 (i.e., FIG. 1B is a cross-sectional view of the antenna beams 22 taken at an elevation angle of 0°). As shown in FIG. 1B, the boresight pointing direction of the three antenna beams 22-1, 22-2, 22-3 are 0°, 120° and −120° (240°) in the azimuth plane so that each antenna beam 22 covers a 120° sector in the azimuth plane. Each antenna beam 22 has a width that is designed to provide good coverage to its respective 120° sector while having low spillover of RF energy into the two adjacent sectors. Referring again to FIG. 1A, each base station antenna 20 may include two columns or "linear arrays" 24-1, 24-2 of dual-polarized radiating elements 26. A four-port radio (not shown) may be coupled to each base station antenna, with two ports (one for each polarization) coupled to the first linear array 24-1 and the other two ports coupled to the second linear array 24-2. Each base station antenna 20 may therefore support 4×MIMO (multi-input-multi-output) communications for a respective one of the three 120° sectors. The small cell base station 10 may provide good performance. However, the small cell base station 10 may resemble a scaled-down microcell base station and hence may be a relatively expensive solution.

FIG. 2 is a schematic top view of a conventional base station antenna 50 for a small cell base station. Base station antenna 50 has a tubular reflector 52 that includes four vertically-extending panels 54-1 through 54-4. The antenna 50 includes eight vertically-extending columns 56-1 through 56-8 of radiating elements, with two columns 56 mounted to extend outwardly from each panel 54 of the reflector 52. A respective four-port radio (not shown) may be associated with each panel 54 of the reflector 52, with two ports (one for each polarization) coupled to the first linear array 56 on the panel 54, and the other two ports coupled to the second linear array 56 on the panel 54. Each base station antenna 50 may therefore support 4×MIMO (multi-input-multi-output) communications for each panel 54 (e.g., for each of four 90° sectors). A single base station antenna 50 may thus provide full 360° (omnidirectional) coverage in the azimuth plane.

SUMMARY

Pursuant to embodiments of the present invention, base station antennas are provided that include a plurality of pairs of RF ports, a tubular reflector, a plurality of columns of first frequency band radiating elements that are mounted to extend outwardly from the tubular reflector, the columns extending around a periphery of the tubular reflector and grouped into a plurality of column groups, where each column group includes at least two columns, and a plurality of feed networks, where each feed network connects one of the pairs of RF ports to a respective one of the column groups.

The tubular reflector may include a plurality of flat faces in some embodiments. Each pair of adjacent faces may define a respective angle within an interior of the tubular reflector, and the sum of the angles defined by the pairs of adjacent faces may be equal to 360°. In other embodiments, the tubular reflector may have a substantially circular cross-section.

The column groups may be arranged in pairs, and each pair of column groups is configured to be coupled to a respective one of a plurality of four-port radios in some embodiments. In such embodiments, the first column group of each pair of column groups may be configured to be coupled to first and second ports of the respective one of the four-port radios, and the second column group of each pair of column groups may be configured to be coupled to third and fourth ports of the respective one of the four-port radios. In other example embodiments, the column groups may be arranged in groups of three or four column groups, and each set of three or four column groups may be configured to be coupled to a respective one of a plurality of six-port or eight-port radios, respectively. Many other configurations are possible.

In some embodiments, the antenna may include at least twelve columns of first frequency band radiating elements. For example, eighteen columns of first frequency band radiating elements may be provided that are divided into six column groups having three columns of first frequency band radiating elements each, where each column group is configured to provide coverage to a 60° sector in an azimuth plane. As another example, the antenna may include twenty-four columns of first frequency band radiating elements that are divided into eight column groups having three columns of first frequency band radiating elements each, where each column group is configured to provide coverage to a 45° sector in an azimuth plane. The number of columns of radiating elements included in the antenna and/or the number of column groups may be varied, as may the number of ports on each radio.

In some embodiments, a plurality of four-port radios may be provided that are each configured to support four-input-four-output multi-input-multi-output ("MIMO") communications through a respective pair of adjacent column groups. The radios may be mounted within a center of the tubular reflector in some embodiments.

In some embodiments, adjacent columns are spaced apart by less than 0.6 of a wavelength that corresponds to a center frequency of the first frequency band.

In some embodiments, each feed network may include first and second phase shifters for each column of first frequency band radiating elements, and a single respective remote electronic tilt actuator may be provided to adjust the phase shifters associated with the columns of first frequency band radiating elements included in each column group.

Pursuant to further embodiments of the present invention, base station antennas are provided that include a plurality of RF ports that are configured to be coupled to one or more beamforming radios that have a plurality of radio ports, a tubular reflector, and a plurality of columns of first frequency band radiating elements that are mounted to extend outwardly from the tubular reflector, the columns extending around a periphery of the tubular reflector. Each column of first frequency band radiating elements is coupled to a respective pair of the RF ports, and the one or more beamforming radios are configured to selectively feed RF signals to different subsets of the columns of first frequency band radiating elements.

In some embodiments, the beamforming radios are configured to electronically steer the antenna beams.

In some embodiments, the columns of first frequency band radiating elements are equally spaced around the periphery of the tubular reflector so that boresight pointing directions of each pair of adjacent columns of first frequency band radiating elements are separated by a first angle, where the beamforming radios are configured to electronically steer the antenna beams no more than the first angle.

In some embodiments, the tubular reflector has a substantially circular cross-section or a plurality of flat faces. Each pair of adjacent faces define a respective angle within an interior of the tubular reflector, and the sum of the angles defined by the pairs of adjacent faces is equal to 360°.

In some embodiments, the plurality of columns of first frequency band radiating elements comprises eighteen columns of first frequency band radiating elements, and the one or more beamforming radios comprises a thirty-six port beamforming radio. In another example embodiment, the plurality of columns of first frequency band radiating elements comprises twenty-four columns of first frequency band radiating elements, and the one or more beamforming radios comprises a forty-eight port beamforming radio.

In some embodiments, adjacent columns are spaced apart by less than 0.6 of a wavelength that corresponds to a center frequency of the first frequency band.

In some embodiments, the one or more beamforming radios are mounted within a center of the tubular reflector.

In some embodiments, each feed network includes first and second phase shifters for each column of first frequency band radiating elements, and a remote electronic tilt actuator system for the base station antenna is configured to adjust all of the phase shifters by the same amount In some embodiments, the plurality of radio ports of the one or more beamforming radios are connected to the RF ports via a switching network.

In some embodiments, the one or more beamforming radios are configured to selectively feed RF signals to the different subsets of the columns of first frequency band radiating elements to simultaneously generate multiple composite antenna beams.

In some embodiments, at least two of the subsets of columns of first frequency band radiating elements include a first of the columns of first frequency band radiating elements so that the first of the columns of first frequency band radiating elements is used to simultaneously generate at least two different composite antenna beams.

In some embodiments, the one or more beamforming radios are configured to selectively feed a first RF signal to a first subset of the columns of first frequency band radiating elements while simultaneously selectively feeding a second RF signal to a second subset of the columns of first frequency band radiating elements, where the first and second subsets of the columns share at least one common column.

DETAILED DESCRIPTION

Figure 1A:
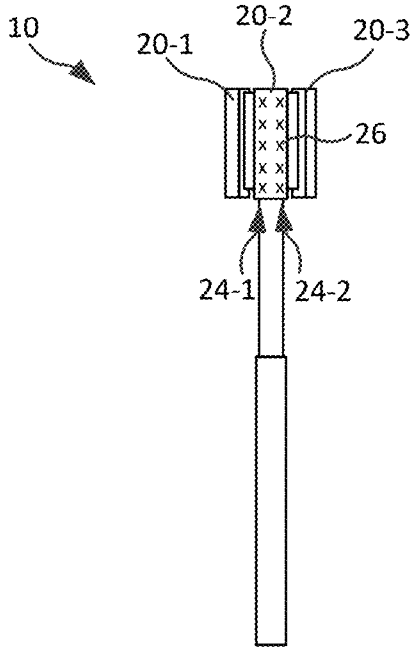
FIG. 1A (Prior Art)
FIG. 1A is a schematic diagram illustrating a small cell base station that includes three conventional "sector" base station antennas.

Pursuant to embodiments of the present invention, cylindrical (or quasi-cylindrical) small cell antennas are provided that may be configured for fixed-beam or beamforming operation. These antennas may include a large number of vertically-extending linear arrays or "columns" of radiating elements and use multiple of the columns to generate each antenna beam, which acts to narrow the azimuth beamwidths of the antenna beams. As a result, these small cell base station antennas may generate antenna beams that have higher gain than many conventional small cell base stations. The columns of radiating elements may be mounted on a cylindrical or many-faced reflector (e.g., one face for each column), which facilitates generating antenna beams that have better physical properties such as improved uniformity, reduced sidelobe levels and the like.

When operated as fixed-beam antennas, the small cell antennas according to embodiments of the present invention may generate four or more antenna beams at each polarization to form an X-sector base station, where X is equal to four or more so that each sector covers an angle of 90° or less in the azimuth plane. For example, in some embodiments, the small cell base station antenna may generate six antenna beams at each polarization to form a six-sector base station, where each sector covers an angle of about 60° in the azimuth plane. In other example embodiments, the antenna may generate nine antenna beams at each polarization to form a nine-sector base station or twelve antenna beams at each polarization to form a twelve-sector base station. The generated antenna beams may have increased gain and hence support higher throughputs. The antennas may support 2×MIMO, 4×MIMO or higher order MIMO communications. In some embodiments, the radios associated with the antenna may be mounted within a central cavity of the antenna. These antennas may include a circular reflector or a reflector having a large number of external panels or "faces" such as twelve or more faces.

When operated as beamforming antennas, the antenna may be coupled to beamforming radios that may transmit RF signals through various subsets of the columns of radiating elements. Each RF signal is transmitted using a selected group of the columns that are selected for that particular RF signal. For example, a first RF signal may be transmitted through a first subset of the columns and a second RF signal may be simultaneously transmitted through a second subset of the columns. The first and second subsets of the columns may or may not include overlapping columns (i.e., the same column may be in both the first and second subsets of the columns and may be used in simultaneously transmitting the first and second RF signals. Many more than two RF signals may be transmitted at a time. For example, ten or more subsets of the columns may transmit RF signals simultaneously. Since each RF signal may be transmitted using multiple columns of radiating elements, the RF signals may form antenna beams that have narrowed beamwidths in the azimuth plane and higher gain. The columns that are included in each group of columns may be selected based on the locations of the user(s) to which the RF signal is to be transmitted. For example, if the antenna transmits an RF signal to a user located at an azimuth angle of 30°, the radio may transmit the RF signal through a small number of the columns (e.g., 3-6) of the antenna that have boresight pointing directions that are the closest to 30°. In this manner, a narrow, high gain antenna beam may be generated that may have a boresight pointing direction that points at least nearly in the direction of the user. Moreover, in some embodiments, the beamforming radios may be further configured to electronically scan the antenna beam generated by the selected columns so that the boresight pointing direction of the antenna beam in the azimuth plane is pointed directly at the user.

In some embodiments, fixed-beam small cell base station antennas are provided that include a plurality of pairs of RF ports, a tubular reflector, a plurality of columns of first frequency band radiating elements that are mounted to extend outwardly from the tubular reflector, the columns extending around a periphery of the tubular reflector and grouped into a plurality of column groups, where each column group includes at least two columns, and a plurality of feed networks. Each feed network connects one of the pairs of RF ports to a respective one of the column groups.

The tubular reflector may include a plurality of flat faces or may alternatively have substantially circular cross-section. In an example embodiment, the column groups may be arranged in pairs, and each pair of column groups may be configured to be coupled to a respective one of a plurality of four-port radios. For example, the first column group of each pair of column groups may be configured to be coupled to first and second ports of the respective one of the four-port radios, and the second column group of each pair of column groups may be configured to be coupled to third and fourth ports of the respective one of the four-port radios. It will be appreciated, however, that radios with other numbers of ports may be used.

In other embodiments, beamforming small cell base stations are provided that include one or more beamforming radios that together have a plurality of radio ports, a tubular reflector, and a plurality of columns of first frequency band radiating elements that are mounted to extend outwardly from the tubular reflector, the columns extending around a periphery of the tubular reflector. Each column of first frequency band radiating elements is coupled to a respective pair of the radio ports, and the one or more beamforming radios are configured to selectively feed RF signals to different subsets of the columns of first frequency band radiating elements.

In some embodiments, the beamforming is performed solely by selecting the columns that the RF signal is transmitted through. In other embodiments, the beamforming radios may be configured to additionally electronically steer the antenna beam formed by the selected columns. The columns of first frequency band radiating elements may be equally spaced around the periphery of the tubular reflector so that boresight pointing directions of each pair of adjacent columns of first frequency band radiating elements are separated by a first angle. In embodiments where electronic beam steering is performed, the beamforming radios may be configured to electronically steer the antenna beams no more than the first angle. The tubular reflector may include a plurality of flat faces or may alternatively have substantially circular cross-section.

Example embodiments of the invention will now be discussed in more detail with reference to FIGS. 3A-6D.

Figure 3A:
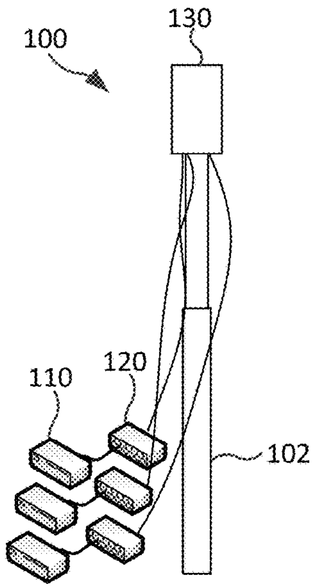
FIG. 3A is a schematic diagram illustrating a small cell base station according to embodiments of the present invention.

FIG. 3A is a schematic diagram illustrating a small cell base station 100 according to embodiments of the present invention. The base station 100 includes baseband equipment 110, radios 120, and a base station antenna 130. The base station antenna 130 may be mounted on a raised structure 102. In the depicted embodiment, the structure 102 is a small antenna tower, but it will be appreciated that a wide variety of mounting locations may be used including, for example, electric utility poles, light poles and the like. The base station antenna 130 may generate a plurality of antenna beams that provide omnidirectional (i.e., 360°) coverage in the horizontal or "azimuth" plane (i.e., a plane that is parallel to the plane defined by the horizon). These antenna beams may have a suitable beamwidth (e.g., 10-30°) in the vertical or "elevation" plane. The antenna beams may be down-tilted in the elevation plane to reduce interference with adjacent base stations (not shown).

The baseband units 110 and radios 120 may be mounted on the ground, on the antenna mounting structure 102, or fully or partially within the base station antenna 130. Each baseband unit 110 may receive data from another source such as, for example, a backhaul network (not shown) and may process this data and provide a baseband data stream to one or more of the radios 120. The radios 120 may generate RF signals that include the data encoded therein and may amplify and deliver these RF signals to the base station antenna 130 for transmission. It will also be appreciated that the base station 100 of FIG. 3A will typically include various other equipment (not shown) such as, for example, a power supply, back-up batteries, a power bus, Antenna Interface Signal Group ("AISG") controllers and the like.

Figure 3B:
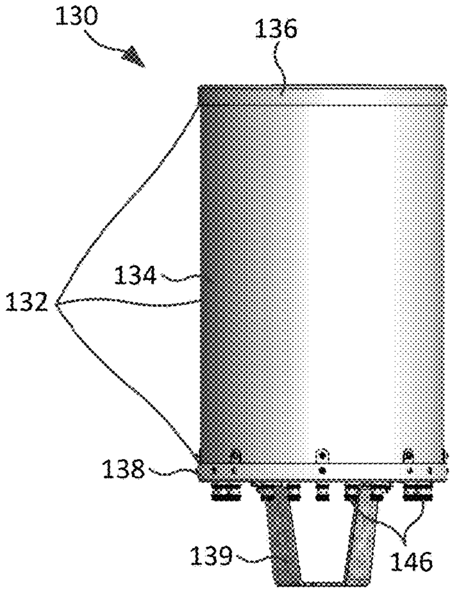
FIG. 3B is a perspective view of the base station antenna included in the small cell base station of FIG. 3A.

FIG. 3B is a perspective view of the base station antenna 130 included in the base station 100 of FIG. 3A. As shown in FIG. 3B, the base station antenna 130 may have a generally cylindrical housing 132 that includes a radome 134, a top end cap 136 and a bottom end cap 138. The radome 134 may be formed of a dielectric material such as fiberglass or plastic, and may be substantially transparent to RF energy in the frequency range in which the base station antenna 100 is designed to operate. A plurality of RF ports 146 may be mounted in the bottom end cap 138. The radios 120 may be connected to the RF ports 146 by, for example, coaxial cables. As will be discussed below, in other embodiments the radios 120 may be mounted within the interior of the antenna 130. In such embodiments, the radios 120 may optionally be directly connected to the antenna 130 via, for example, blind mate connectors without the need for any cabling connections. A mounting bracket 139 may be provided for mounting the antenna 130 on a light pole or other mounting structure 102.

In some embodiments, the radios 120 may include heat dissipation fins 122. Moreover, in some embodiments, the antenna 130 may be configured to extend around a mounting pole 102 as opposed to being mounted on top of the pole 102 or other mounting structure (different mounting brackets 139 may be provided in such embodiments for mounting the antenna mid-span on the pole 102). In such embodiments, the heat dissipation fins 122 may directly contact the mounting pole 102 or a conductive (e.g., metal) insert 124 may be provided that physically connects the fins 122 to the pole 102. Such a design may facilitate transferring heat generated by the radios 120 to the pole 102 which may act as a chimney to remove heat from the interior of antenna 130.

Figure 3D:
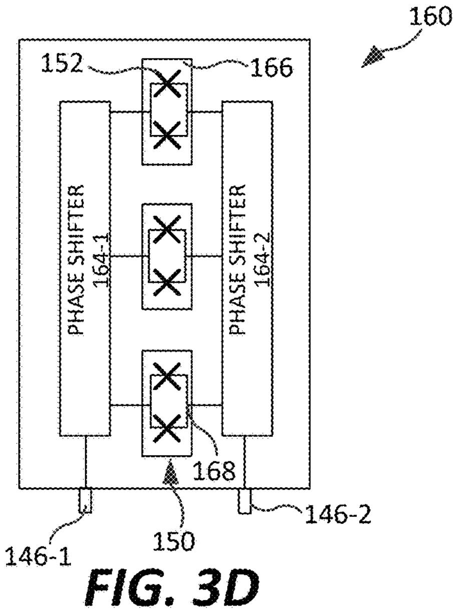
FIG. 3D is a schematic diagram of a feed network for one of the linear arrays of the base station antenna of FIG. 3B.
Figure 3C:
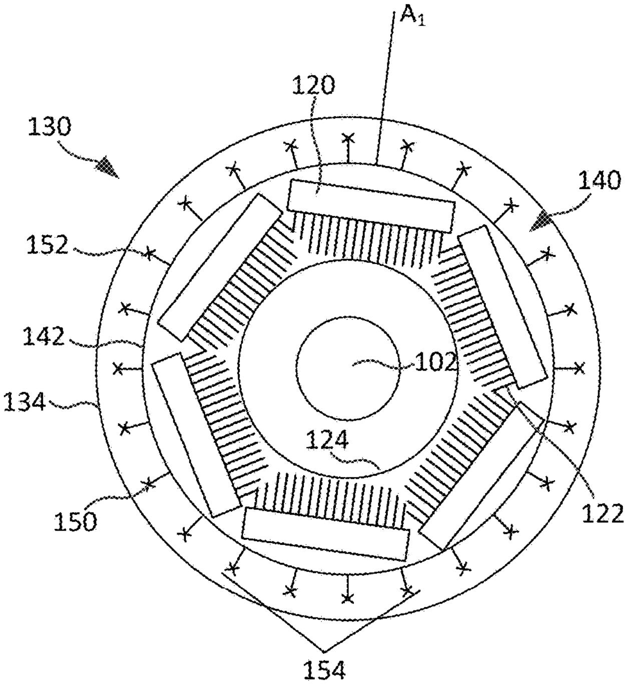
FIG. 3C is a schematic top view of the base station antenna of FIG. 3B with the top cap removed.

FIG. 3C is a schematic top view of the base station antenna 130 of FIG. 3B with the top cap removed. As shown in FIG. 3C, an antenna assembly 140 is enclosed within the housing 132. The antenna assembly 140 includes a tubular reflector assembly 142 and a plurality (here twenty-four) columns 150 of radiating elements 152. It will be appreciated that in the top view of FIG. 3C only the top radiating element 152 of each column 150 is visible. The radiating elements 152 may be mounted on the tubular reflector assembly 142 and may extend outwardly from the outer surface of the tubular reflector assembly 142. The tubular reflector assembly 142 may serve as a ground plane for the radiating elements 152 and as a reflector that redirects outwardly RF radiation that is emitted toward the tubular reflector assembly 142. The tubular reflector assembly 142 may substantially extend in the vertical direction when the base station antenna 130 is mounted for normal use. As shown in FIG. 3C, in some embodiments the tubular reflector assembly 142 may have a cylindrical shape with an open interior. In such embodiments, the tubular reflector assembly 142 has a substantially circular horizontal cross-section. In other embodiments (see FIG. 4A), the tubular reflector assembly 142 may instead include a plurality of planar faces that surround an open interior. In still other embodiments, fewer faces may be provided (e.g., two columns 150 of radiating elements 152 may be mounted on each face of the reflector 142), or the tubular reflector assembly 142 may include more faces than columns of radiating elements. In each of the above embodiments, the columns 150 of radiating elements 152 may be mounted to extend outwardly from the tubular reflector assembly 142, with each column 150 spaced an equal distance from its adjacent columns 150. The tubular reflector assembly 142 may comprise a unitary structure or may comprise a plurality of structures that are attached together.

The radiating elements 152 may each be configured to operate in a first frequency band such as, for example, the 1695-2690 MHz frequency band, or a portion thereof, or the 3100-3800 MHz frequency band, or a portion thereof. Each radiating element 152 may comprise, for example, a feed stalk and a pair of dipole radiators that are mounted on the feed stalk. The two dipole radiators may be arranged at angles of −45° and +45° with respect to the plane defined by the horizon in a so-called "cross-dipole" arrangement so that each radiating element 152 is a dual-polarized radiating element. The feed stalk may comprise, for example, a pair of microstrip printed circuit boards that are arranged in an "X" configuration.

As is further shown in FIG. 3C, in some embodiments, one or more of the radios 120 of base station 100 can be mounted within the open interior of the tubular reflector assembly 142. The front side of each radio 120 may face the tubular reflector assembly 142, and the rear side of each radio (which may include heat dissipation fins 122) may face inwardly towards a central axis of the tubular reflector assembly 142.

FIG. 3D is a schematic diagram of a feed network 160 for one of the columns 150 of radiating elements 152. Identical feed networks 160 may be provided for all of the columns 150 of radiating elements 152. In the depicted embodiment, the column 150 includes a total of six radiating elements 152. It will be appreciated, however, that any appropriate number of radiating elements 152 may be included in each column 150. Each of the radiating elements 152 may be identical, and all of the columns 150 will typically include the same number of radiating elements 152.

As shown in FIG. 3D, the feed network 160 couples two of the RF ports 146 to each column 150 of radiating elements 152. Each RF port 146 is coupled to a respective phase shifter assembly 164, either directly (as shown in FIG. 3D) or through intervening components (e.g., a power divider, as shown in FIG. 4B). The phase shifter assembly 164 may include a power divider (not separately shown) that splits RF signals input to the phase shifter assembly 164 into a plurality of sub-components, and a phase shifter (not separately shown). The phase shifter may comprise, for example, an electromechanical phase shifter such as a wiper arm phase shifter, a trombone phase shifter or a sliding dielectric phase shifter. The phase shifter, however implemented, may apply a phase progression to the sub-components of the RF signal that are output by the power divider portion of the phase shifter assembly 164 to, for example, apply an electronic downtilt to the antenna beam that is formed when the sub-components of the RF signal are transmitted (or received) through the column 150 of radiating elements 152. Each output of the phase shifter assembly 164 is coupled to the first polarization radiators of one or more of the radiating elements 152 in the column 150. In the depicted embodiment, the phase shifter assembly 164 includes three outputs, and each output is coupled to a respective pair of radiating elements 152 through a respective 1×2 power divider 168. Each pair of radiating elements 152 is mounted on a feed board printed circuit board 166, and the power dividers 168 are formed on the feed boards 166 in the depicted embodiment.

The base station antenna 100 may be configured as a fixed-beam antenna. When configured as a fixed-beam antenna, the base station antenna 100 may generate a plurality of "sector" antenna beams that have a generally fixed shape (although some variation in the shape and characteristics of the antenna beams may occur as the amount of electronic downtilt applied to the antenna beam is changed), and each antenna beam may thus provide coverage to a predefined sector in the azimuth plane. Multiple of the columns 150, which may be referred to herein as a "column group" 154, may be used to form each sector antenna beam. As a result, each antenna beam may have a narrowed beamwidth in the azimuth plane. In the depicted embodiment (FIG. 3C), the antenna 130 includes twenty-four columns 150 that generate six sector antenna beams. Thus, four columns 150 are used to generate each antenna beam. Each antenna beam may cover a 60° sector in the azimuth plane.

The base station antenna 100 may alternatively be configured as a beamforming antenna. When configured as a beamforming antenna, the antenna 100 may be used in conjunction with one or more beamforming radios (not shown) that may feed RF signals to selected sub-sets or column groups 154 of the columns 150 in order to generate antenna beams that can be pointed in any desired direction in the azimuth plane. For example, the beamforming radio may form a first RF signal from a first baseband data stream and split this first RF signal into four sub-components. The radio may appropriately adjust the amplitude and phase of each sub-component and transmit the four sub-components of the RF signal through four adjacent ones of the columns 150. The amplitudes and phases of the four RF sub-components may be selected so that a first composite antenna beam is generated that has a boresight pointing direction in the azimuth plane that corresponds to a horizontal axis $A_1$ (see FIG. 3C) that extends outwardly from the tubular reflector assembly 142 halfway between the middle two of the four columns 150. Subsequently, the beamforming radio (s) 120 may simultaneously generate additional RF signals from additional baseband data streams, and these additional RF signals may again by sub-divided into four sub-components (or some other number of sub-components if more or less than four columns are used to transmit each additional RF signal), the amplitude and phase of each sub-component may be adjusted, and the sub-components may be transmitted through four (or some other number of) adjacent ones of the columns 150 (which may or may not include some of the same columns 150 used to transmit the first RF signal) in order to generate additional antenna beams that point in different directions. In this fashion, the antenna 100 may be used to generate narrow, high gain antenna beams that point toward each user or group of users in order to support very high capacity transmissions. Moreover, this may be accomplished without electronically scanning the antenna beam as the selection of the appropriate columns 150 that are used to transmit each RF signal is used to change the pointing directions of the antenna beams.

In some embodiments, the beamforming radio(s) 120 may be further configured to electronically scan the antenna beam in the azimuth plane so that it may point directly in a desired direction (e.g., may point directly toward a subscriber). This capability may allow the antenna beam to be pointed directly at individual subscribers (in the azimuth plane), which can result in higher antenna gain.

The configuration and operation of example fixed-beam embodiments of the base stations according to embodiments of the present invention will now be described in greater detail with reference to FIGS. 4A-4C and 5.

Figure 4A:
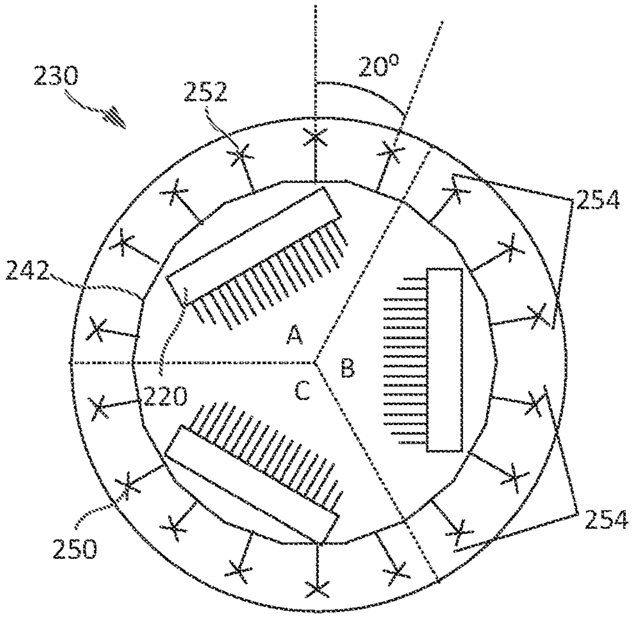
FIG. 4A is a schematic top view of a fixed-beam small cell base station according to embodiments of the present invention.
Figure 4B:
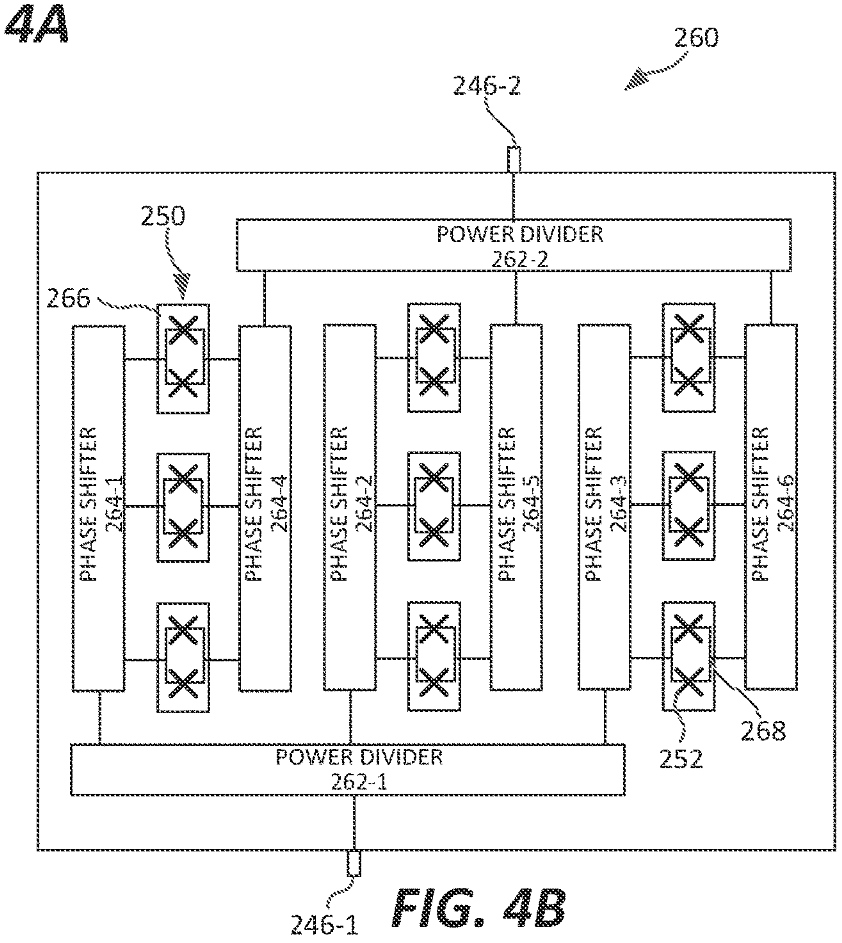
FIG. 4B is a schematic diagram of a feed network for three of the linear arrays of the base station antenna of FIG. 4A.

FIG. 4A is a schematic top view of a fixed-beam base station antenna 230 according to embodiments of the present invention. As shown in FIG. 4A, three radios 220-1, 220-2, 220-3 are mounted within the interior of base station antenna 230. It will be appreciated that in other embodiments the radios 220 may be located outside of antenna 230 (e.g., on the ground or on a mounting structure for antenna 230). The small cell antenna 230 is similar to small cell antenna 130 discussed above. Thus, the description below will focus on the differences between antennas 130 and 230.

As shown in FIG. 4A, the antenna 230 includes a tubular reflector assembly 242. In the depicted embodiment the reflector assembly has eighteen planar outer faces 244 (and hence has an eighteen-sided horizontal cross-section), but it will be appreciated that other configurations are possible. For example, the reflector assembly could alternatively have a cylindrical design in which case it would have a circular horizontal cross-section, or could have nine planar outer faces 244 with two columns 250 mounted on each face 244. The antenna 230 includes eighteen columns 250 of radiating elements 252. The radiating elements 252 may each be configured to operate in a first frequency band such as, for example, the 1695-2690 MHz frequency band, or a portion thereof, or the 3100-3800 MHz frequency band, or a portion thereof. The radiating elements 252 are mounted to extend outwardly from the tubular reflector assembly 242. The tubular reflector assembly 242 may serve as a ground plane and reflector for the radiating elements 252.

Three radios 220-1, 220-2, 220-3 are mounted within the interior of the tubular reflector assembly 242. Each radio 220 is a four-port radio in this embodiment. Each radio 220 provides coverage to a respective 120° sector in the azimuth plane. The columns 250 are distributed equally around the periphery of the tubular reflector 242. Since a total of eighteen columns 250 are included in antenna 230, the boresight pointing directions of the antenna beams generated by each column 250 are offset by 20° from adjacent antenna beams in the azimuth plane, as schematically shown in FIG. 4A. Six columns 250 are provided for each 120° sector in the azimuth plane (labelled sectors A, B and C in FIG. 4A. The six columns 250 are divided into two columns groups 254 having three columns 250 each. Each column group 254 is coupled to two of the four ports 246 of a respective one of the radios 220, with the first port 246 connected to the first polarization radiators of the radiating elements 252 in the three columns 250, and the second port 246 connected to the second polarization radiators of the radiating elements 252 in the three columns 250. Since three columns 250 are used to generate each antenna beam, the antenna beam may have a narrowed azimuth beamwidth as compared to columns of radiating elements in most conventional base station antennas, which generate antenna beams that are designed to cover an entire 120° sector in the azimuth plane. The generated antenna beams may, for example, have a half power azimuth beamwidth of about 25°-40° (over the full operating frequency band of the radiating elements 252), and more preferably have a half power azimuth beamwidth of about 27°-33° over at least much of the operating frequency band of the radiating elements 252. Such a half power beamwidth in the azimuth plane may be well-suited for the antenna beams to provide coverage to a 60° sub-sector of the 120° sector. In other words, each set of six columns 250 that is associated with a respective one of the radios 220 may act as a twin beam sector-splitting antenna, with each three column 250 column group 254 generating a sector-splitting antenna beam at each polarization.

The small cell antenna 200 includes a large number of columns 250 (eighteen in the depicted embodiment). As a result, multiple columns 250 may be used to form each antenna beam, which allows for higher antenna gain and hence increased capacity. The azimuth beamwidth of each composite antenna beam is a function of the azimuth beamwidth of the antenna beams generated by each individual radiating element 252 in the column group 254, as well as the array factor (which is a function of the number of columns 250 of radiating elements and the horizontal spacing between the columns 250). The amplitudes of the sub-components of the RF signal that are fed to each column 250 as well as the relative phases of the sub-components fed to each column 250 may be adjusted so that the antenna beams will have a suitable azimuth beamwidth.

Since the three columns 250 that are used to form each antenna beam have different boresight pointing directions in the azimuth plane, the generated antenna beams may have a better shape for providing coverage to each 60° sub-sector as compared to antenna beams generated by three columns of radiating elements that are all mounted on a planar reflector. In particular, since the columns 250 are mechanically steered by the design of antenna 230 (i.e., the columns mechanically point in different directions in the azimuth plane), the worst case amount of electronic steering that must be performed may be reduced. Since electronic steering tends to distort the resultant antenna beam in undesirable ways (e.g., higher sidelobe levels, larger grating lobes, etc.), with the effects becoming more pronounced the more that the antenna beam is electronically steered, the antenna 230 may exhibit improved performance. Additionally, since each three-column 250 column group 254 is connected to two ports of its associated radio 220 (for the two different polarizations), the base station 200 may operate using 2×MIMO communications in each 60° sub-sector. Moreover, in some cases, the base station 200 may operate using 4×MIMO communications by transmitting a data stream through the two column groups 254 associated with a particular sector. For example, if users are located near the crossover region between the two 60° sub-sectors of a 120° sector, improved performance may be achieved if RF signals are transmitted to such users using 4×MIMO communications that are transmitted through all four ports of the radio 220 (and through both column groups 254 serving the sector). As another example, in many urban environments tall building will reflect RF signals so that subscribers may receive RF signals with high gain from arrays of radiating elements that do not have boresight pointing directions that point in the general direction of the subscribers. In such environments, using both column groups 254 to operate the base station antenna 230 using 4×MIMO communications techniques may provide enhanced performance. If the three four port radios are replaced with a different radio (e.g., a single twelve port radio), higher order MIMO techniques may be used (e.g., 8×MIMO or 12×MIMO) in appropriate settings.

FIG. 4B is a schematic diagram of a feed network 260 for three of the columns 250 of radiating elements 252 (i.e., one column group 254) of base station antenna 230 of FIG. 4A. As discussed above, each column group 254 is coupled to two ports of the radio 220 associated therewith (one for each polarization) through two of the RF ports 246 of base station antenna 230.

The first RF port 246-1 is connected to a 1×3 power divider 262-1. Power divider 262-1 divides RF signals input thereto into three sub-components, which may or may not have equal amplitudes depending upon the design of antenna 230. The three outputs of power divider 262-1 are connected to respective phase shifter assemblies 264-1 through 264-3. Each phase shifter assembly 264 includes a power divider and a phase shifter (neither of which is shown separately). The power divider included in each phase shifter assembly 264 further sub-divides the sub-components of RF signals input thereto into three smaller sub-components. The phase shifter included in each phase shifter assembly 264 applies a phase progression to the three sub-components to, for example, apply an electronic downtilt to the antenna beam that is formed when the sub-components of the RF signal are transmitted (or received) through the column 250 of radiating elements 252. Each output of the phase shifter assembly 264 is coupled to a feed board 266 which, in the depicted embodiment, has two radiating elements 252 mounted thereon. The sub-components of the RF signal that are output to each feed board 266 are passed to a respective 1×2 power divider 268, which further sub-divides the RF signal (the RF signal is subdivided into eighteen sub-components that are fed to the first polarization radiators of the eighteen radiating elements 252 included in the three columns 250 forming the column group 254. The portion of feed network 260 that feeds the second polarization radiators of the radiating elements 252 may be identical to the above-described portion that feeds the first polarization radiators, and hence further description thereof will be omitted. It will be appreciated that in some embodiments, the base station antenna 230 may have a fixed electronic downtilt (which may be at an angle of 0° or some other fixed angle). Such a design may reduce the cost of the antenna by simplifying the feed network and removing the need for any RET actuators and associated circuitry and components. In such embodiments, the phase shifter assemblies 264-1 through 264-6 that are shown in FIG. 4B may be replaced with power dividers.

Figure 4C:
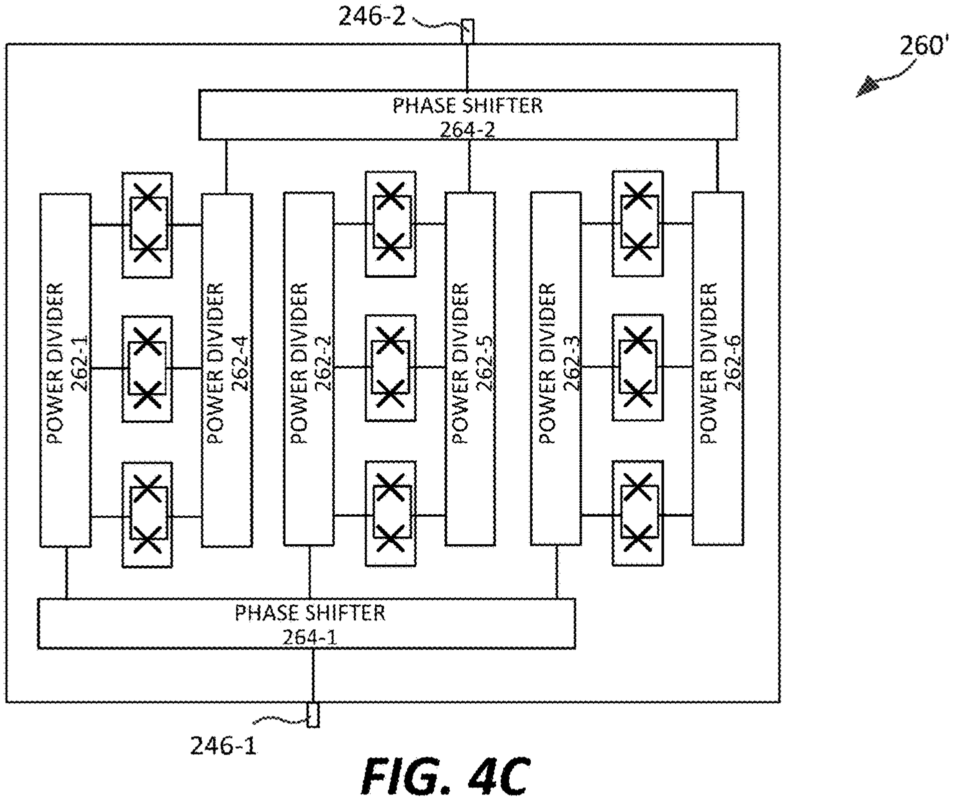
FIG. 4C is a schematic diagram of another feed network for three of the linear arrays of the base station antenna of FIG. 4A.

FIG. 4C is a schematic diagram of another feed network 260' for three of the linear arrays of the base station antenna of FIG. 4A. The feed network 260' is similar to feed network 260, except that the positions of the power dividers 262 and the phase shifter assemblies 264 are reversed. This reduces the number of phase shifter assemblies 264 from six to two for each column group 254, thereby reducing the total number of phase shifter assemblies 264 from thirty-six to twelve. Since the phase shifter assemblies 264 are significantly larger and more complicated than the power dividers 262, and require associated equipment such as remote electronic tilt actuators and mechanical linkages, the feed network of FIG. 4C may be preferred over the feed network 260 of FIG. 4B. However, if the feed network 260 of FIG. 4B is implemented using external power dividers, then the same feed network design may be used for both fixed-beam and beamforming antennas, potentially allowing the same antenna to be sold for both fixed-beam and beamforming applications.

Figure 5:
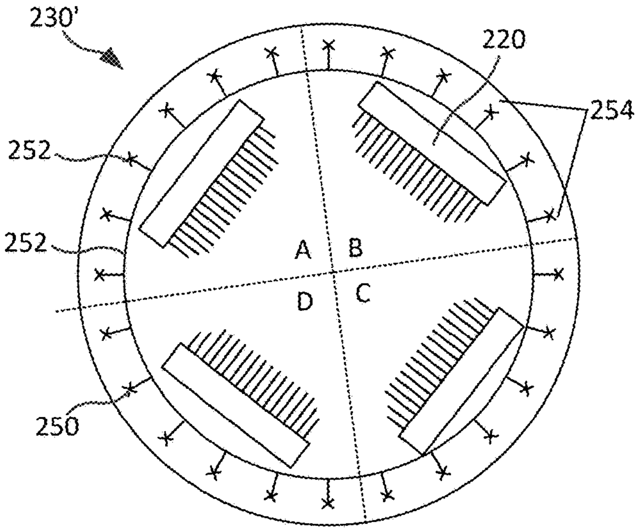
FIG. 5 is a schematic top view of a fixed-beam small cell base station according to further embodiments of the present invention.

FIG. 5 is a schematic top view of a fixed-beam small cell base station antenna 230' according to further embodiments of the present invention. The fixed-beam small cell base station antenna 230' is similar to above-described fixed beam small cell base station 200, but includes twenty-four columns 250 and four four-port radios 220. The columns 250 are again divided into column groups 254, with three columns 250 included in each column group 254, for a total of eight column groups 254, each of which generates a pair of antenna beams that provide coverage to a respective sub-sector in the azimuth plane. Since eight antenna beams are formed at each polarization, the size of each sub-sector is reduced to 45° in the azimuth plane. The amplitudes and phases of RF signals fed to each column group 254 may be adjusted so that the antenna beams generated by each column group 254 will have a narrower half power azimuth beamwidth, such as, for example, a half power azimuth beamwidth of about 20°-25°. Base station antenna 200' may otherwise be identical to base station antenna 200, and hence further description thereof will be omitted.

While example fixed-beam embodiments are shown in FIGS. 4A and 5, it will be appreciated that embodiments of the present invention are not limited thereto. For example, in other embodiments, the fixed-beam antennas may include twelve, fifteen or eighteen columns of radiating elements. Other embodiments are possible. The number of columns 250 used in each column group 254 may also be varied. For example, the antenna 230' of FIG. 5 includes twenty-four columns with three columns 250 per column group 254, and hence generates eight antenna beams that each cover 45° in the azimuth plane at each polarization. In another embodiment (not shown), the antenna may have thirty-two columns 250, each column group 254 may have four columns 250, and in such an embodiment the antenna may again generate eight antenna beams that each cover 45° in the azimuth plane at each polarization. In the thirty-two column embodiment, the resultant antenna beams may have lower sidelobes and enhanced roll-off of the main lobe of the antenna beam. Thus, it will be appreciated that the number of columns 250 and/or the number of columns 250 included in each column group 254 may be varied depending on the desired antenna performance.

Figure 6A:
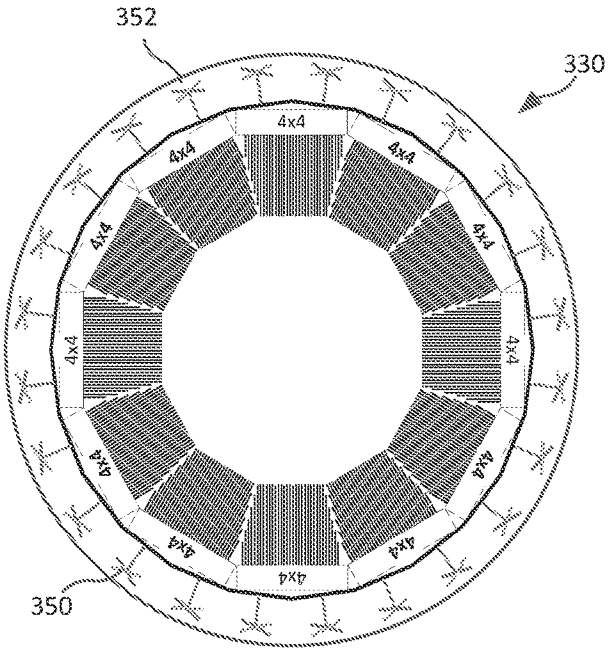
FIG. 6A is a schematic top view of a beamforming small cell base station according to embodiments of the present invention.

FIG. 6A is a schematic top view of a beamforming base station antenna 330 according to further embodiments of the present invention. The base station antenna 330 again includes a large number of columns 350 of radiating elements 352 that point in different directions in the azimuth plane in order to provide omnidirectional coverage in the azimuth plane. The base station antenna 330 may implement adaptive beamforming by selecting different groups of columns 350 of radiating elements 352 and feeding RF signals to each group. In this manner, the base station antenna 330 can simultaneously generate a plurality of antenna beams that each have narrowed azimuth beamwidths. The antenna beams can point in different directions in the azimuth plane, with each antenna beam providing service to a different set of one or more users. The beamforming may be performed by one or more radios 320 associated with base station antenna 330 so that the beamforming is performed in the digital domain, and the columns 350 of radiating elements 352 may be used to generate multiple antenna beams simultaneously, as is discussed in more detail below with reference to FIG. 6B.

The radio 320 that is associated with the antenna 330 may use multiple columns 350 of radiating elements 352 that point in the general direction of the users in a first set of users to form a composite antenna beam that provides coverage to these users. Since multiple columns 350 of radiating elements 352 are used, each antenna beam may have a narrowed beamwidth in the azimuth plane and hence increased gain. Moreover, since columns 350 of radiating elements 352 that point in the general direction of the users are used to form the composite antenna beam, the boresight pointing direction of the individual antenna beams formed by the individual columns 350 of radiating elements 352 that are used to form the composite antenna beam that serves the first set of users need not be electronically scanned very far in the azimuth beam to form the composite beam that provides service to these users. This may reduce grating lobe generation and other undesirable effects that occur when antenna beams are electronically scanned significant amounts.

In some cases, a single radio 320 may be provided that includes at least one port (and typically two ports) for each column 350 of radiating elements 352. One port of the radio 320 (or two radio ports for dual polarized operation) is connected to each of the columns 350 of radiating elements 352 in the antenna 330. The radio 320 may then select which radio ports (and hence columns 350) to feed sub-components of an RF signal to in order to generate antenna beams that point in desired directions. In other cases, the base station antenna 330 may include one or more radios 320 that each have a smaller number of radio ports that are connected to the columns 350 of radiating elements 352 of antenna 330 via a switching network. For example, as shown schematically in FIG. 6D, a single four-port radio 320 may be provided that is connected to a switching network 400 that may be set to connect the four ports of the radio 320 to any set of four adjacent columns 350 (Columns 1-N) of the antenna 330. The antenna 330 may provide omnidirectional (360°) coverage in the azimuth plane by selecting the appropriate columns 350 to illuminate. Multiple four-port radios 320 and associated switch networks 400 may be provided, and multiplexers (not shown) may be interposed between the switch networks 400 and the columns 350 of radiating elements 352 so that the columns 350 may be used to simultaneously form multiple antenna beams.

As shown in FIG. 6A, the base station antenna 330 includes a tubular reflector assembly 342 and a plurality (here twenty-four) columns 350 of radiating elements 352. The columns 350 of radiating elements 352 extend outwardly from the tubular reflector assembly 342 with each column 350 spaced an equal distance from adjacent columns 150. The tubular reflector assembly 342 may serve as a ground plane and as a reflector for the radiating elements 352, and may substantially extend in the vertical direction when the base station antenna 330 is mounted for normal use. As shown, the tubular reflector assembly 342 may have a plurality of planar faces that surround an open interior, and a column 350 of radiating elements 352 may be mounted on each respective face 344. In other embodiments, the tubular reflector assembly 342 may have a cylindrical shape or may have fewer faces 344 (e.g., two columns 350 of radiating elements 352 may be mounted on each face 344). The tubular reflector assembly 342 may comprise a unitary structure or may comprise a plurality of structures that are attached together.

The radiating elements 352 may each be configured to operate in a first frequency band such as, for example, the 1695-2690 MHz frequency band, or a portion thereof, or the 3100-3800 MHz frequency band, or a portion thereof. Each radiating element 352 may comprise a cross-dipole radiating element having two dipole radiators that are arranged at angles of −45° and +45° with respect to the plane defined by the horizon, although other types of radiating elements may be used (e.g., single-polarized dipole radiating elements or patch radiating elements).

One or more of the radios 320 may be mounted within the open interior of the tubular reflector assembly 342. The front side of each radio 320 may face the tubular reflector assembly 342, and the rear side of each radio 320 (which may include heat dissipation fins 324) may face inwardly towards a central axis of the tubular reflector assembly 342.

The antenna 330 includes a plurality of RF ports 346 and a plurality of feed networks 360 that connect each RF port 346 to a respective one of the columns 350. As noted above, in some embodiments, each feed network 360 may have the design shown in FIG. 4B above with the power dividers 262 omitted. In such embodiments, a radio port directly feeds each column 350 and the feed network 360 sub-divides the RF signal output at the radio port into a plurality of sub-components, applies a phase taper to the sub-components of the RF signal, and outputs each sub-component to a feed board 366 where the sub-component is transmitted through one or more radiating elements 352.

Figure 6B:
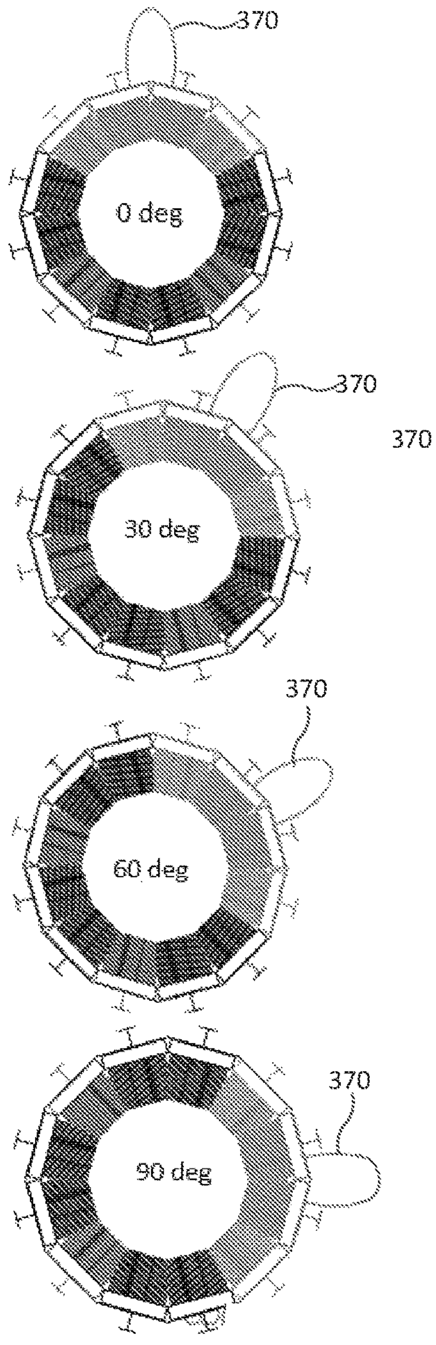
FIG. 6B is a schematic diagram illustrating how RF signals may be fed to different subsets of the linear arrays based on the location of users.
Figure 6C:
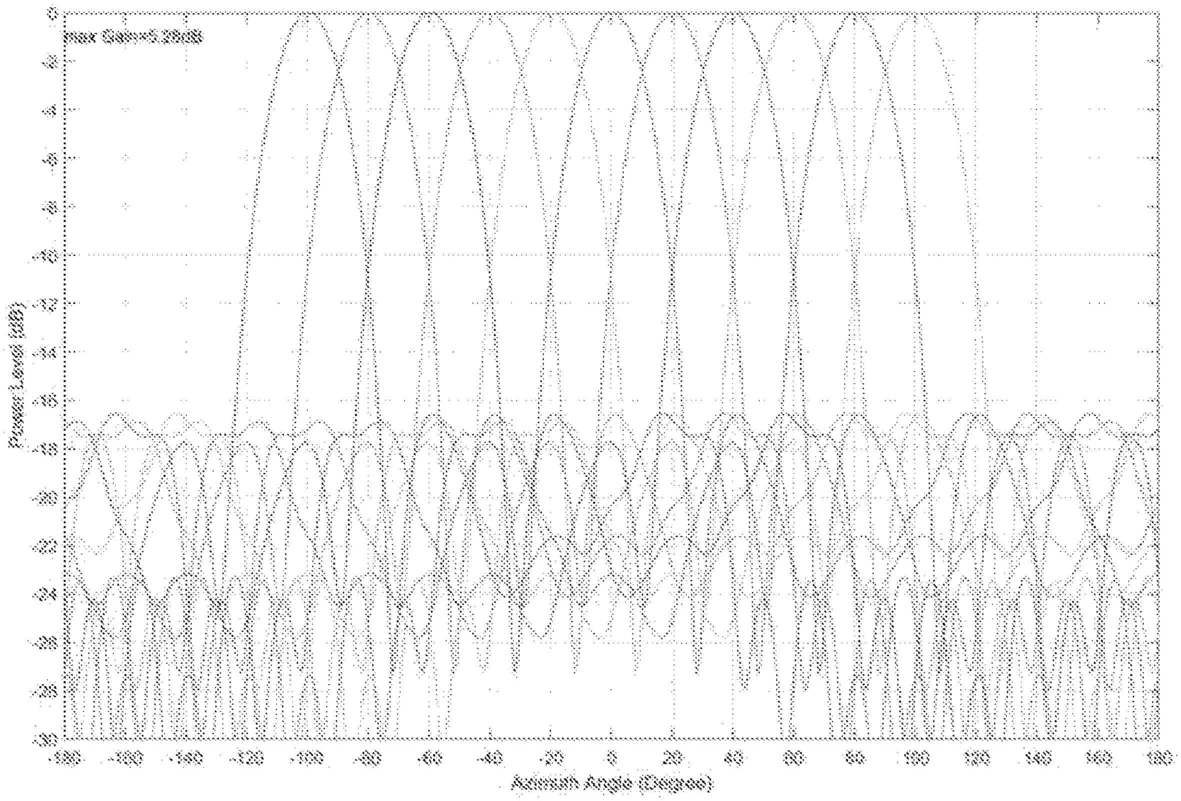
FIG. 6C which is an azimuth plot of eleven of the twenty-four composite antenna beams formed by the antenna of FIG. 6A when five adjacent columns of the antenna are excited by RF signals.
Figure 6D:
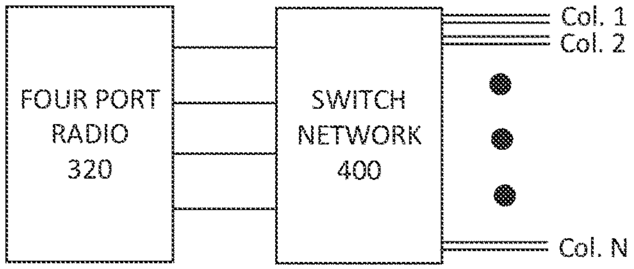
FIG. 6D is a schematic drawing illustrating how a switch network may be used to couple the ports of a radio to selected columns of an antenna according to embodiments of the present invention.

Operation of base station antenna 330 will now be described with reference to FIG. 6B, which is a schematic diagram illustrating how RF signals may be fed to different subsets of the columns 350 to simultaneously generate multiple antenna beams that each point in a respective desired pointing direction in the azimuth plane. FIG. 6B depicts an antenna 330' according to embodiments of the present invention that includes a total of twelve columns 350 of radiating elements (as opposed to the twenty-four columns 350 included in antenna 330 of FIG. 6A) in order to simplify the drawings and accompanying explanation).

As shown in FIG. 6B, a radio 320 may feed RF signals to different sub-sets of the columns 350 of antenna 330' in order to generate antenna beams that point in different directions in the azimuth plane. For example, as shown in the top frame of FIG. 6B, in order to generate an antenna beam that points at an azimuth angle of 0°, a radio 320 that feeds antenna 330 may sub-divide an RF signal and feed the sub-components to columns 350-11, 350-12, 350-1 and 350-2 of base station antenna 330. When excited by these RF signals, the four columns 350 generate a first antenna beam 370-1 that has a relatively narrow azimuth half power beamwidth and that has an azimuth boresight pointing direction of 0°. The antenna beam 370-1 may be used to transmit data to one or more users in a first set of users who are within the coverage area of the antenna beam 370-1. As shown in the second from the top frame of FIG. 6B, in order to generate a second antenna beam 370-2 that points at an azimuth angle of 30°, the radio 320 may sub-divide an RF signal and feed the sub-components to columns 350-12, 350-1, 350-2 and 350-3 of antenna 330. Since column 350-3 is fed instead of column 350-11, the boresight pointing direction of the resultant antenna beam is shifted by 30° in the azimuth plane. The bottom two frames of FIG. 6B illustrate how the radio 320 can form antenna beams 370-3 and 370-4 having a boresight pointing direction of 60° (by feeding columns 350-1 through 350-4) or and 90° (by feeding columns 350-2 through 350-5). It will be appreciated that by feeding RF signals additional groups of four adjacent columns 350, antenna beams may be formed having boresight pointing directions of 120°, 150°, 180°, 210°, 240°, 270° and 300°. These antenna beams can be generated simultaneously so that antenna 330 may generate a plurality of narrow antenna beams through a full 360° in the azimuth plane. Moreover, if desired, the radio 320 may electronically scan the antenna beams 370 by +/−15° in the azimuth plane to optimize the pointing directions of the antenna beams 370.

While FIG. 6B illustrates an example where the radio 320 excites four columns 350 of radiating elements 352 to generate each antenna beam, it will be appreciated that embodiments of the present invention are not limited thereto. For example, in other embodiments, the radio 320 may excite two, three, five, six or more of the columns 350 in order to form antenna beams having different azimuth beamwidths, and may excite different numbers of columns 350 to form different antenna beams 370 at the same time. For example, the antenna 330 may transmit a first RF signal to a first set of users through columns 350-1 through 350-4 and may simultaneously transmit a second RF signal to a second set of users through columns 350-4 through 350-6. The antenna beams 370 formed by the first and second RF signals will have different azimuth half power beamwidths.

When multiple (e.g., four) columns 350 of radiating elements 352 are used to generate a composite antenna beam 370, the phases of the sub-components of the RF signal that are fed to each column 350 may be adjusted relative to each other in order to optimize the shape of the resultant antenna beam 370. For example, the phase of the RF signal fed to each column 350 may be adjusted so that the individual antenna beams 370 formed by the respective columns 350 have the same boresight pointing direction in the azimuth plane in order to generate a composite antenna beam having a maximum gain. This phase adjustment ensures that the individual antenna beams generated by each column 350 of radiating elements 352 is in-phase with the antenna beams generated by the other columns 350 in the desired boresight pointing direction for the composite antenna beam 370. In some embodiments, no other adjustments may be made to the amplitudes and/or phases of the RF signals that are fed to each excited column. This approach may ensure that every antenna beam formed by a different combination of four (or some other fixed number of) adjacent columns 350 of antenna 330' has the exact same shape, gain, sidelobe levels and other characteristics, with the only different between the antenna beams being their respective azimuth boresight pointing directions. Moreover, since electronic scanning of the individual antenna beams is minimized, the composite antenna beams 370 may have excellent characteristics, such as good shapes and low sidelobe levels. This can be seen, for example, with reference to FIG. 6C, which is an azimuth plot of eleven of the twenty-four composite antenna beams formed by the antenna 330 of FIG. 6A when five adjacent columns 350 of the antenna 330 are excited by RF signals. As can be seen, the eleven composite antenna beams each have the exact same shape and differ only in their respective azimuth boresight pointing directions. The remaining thirteen antenna beams—which are identical to the eleven depicted in FIG. 6C—are omitted from the drawing to simplify the graph. Each antenna beam has very low sidelobe levels (more than 16 dB below the peak gain) and crossovers between the main lobes of adjacent composite antenna beams are less than 2 dB below peak gain, meaning that users in different azimuth pointing directions will all receive similar gains.

While in some embodiments, the composite antenna beams are not electronically steered, it will be appreciated that in other embodiments the composite antenna beams may be both "mechanically" steered by selecting the columns used to form the antenna beam and then further electronically steered so that the boresight pointing direction of the antenna beam may be optimized. The electronic steering may be used to shift the azimuth pointing direction of the antenna beam so that the antenna beam points at any desired angle in the azimuth plane. Since the antenna beam may first be steered by selecting the columns that will generate a composite antenna beam that has a boresight direction in the azimuth plane that is closest to the desired boresight pointing direction in the azimuth plane, the amount that the antenna beam must be electronically steered is reduced to be no more than the angular separation between adjacent columns in the azimuth plane. For example, if the antenna has twenty-four columns, the antenna beams will never need to be electronically steered more than 20°. As is known in the art, electronically steering an antenna beam generally degrades certain characteristics of the antenna beam, such as the gain (which may be reduced), the sidelobe levels (which may be increased) and the azimuth beamwidth (which may be increased).

As discussed above, the beamforming antennas according to embodiments of the present invention may include phase shifter assemblies (see, e.g., FIG. 4B) that are used to apply an electronic downtilt to the antenna beams formed by the antenna. This electronic downtilt may be used to adjust the coverage area for the antenna in order to reduce interference between the adjacent cells. Since different combinations of columns 350 of radiating elements 352 may be used to form each antenna beam, the phase shifters may all be set to apply the same amount of electronic downtilt so that each column is electronically downtilted in a consistent manner. Thus, a single remote electronic tilt actuator system may be provided in the beamforming antennas according to embodiments of the present invention that is designed to adjust each phase shifter assembly by the same amount.

The beamforming antennas according to embodiments of the present invention may include a calibration network. The radio(s) 320 may send RF signals through this calibration network to identify amplitude and phase differences between each RF transmission path connecting a port of the radio to the radiating elements 352 of a column 350. Identifying such amplitude and phase differences is important as it allows the radio(s) 320 to digitally compensate for these differences so that the resultant antenna beams are optimized.

It is only necessary to calibrate a beamforming antenna to compensate for the different columns of radiating elements that may be used together. While the beamforming antennas according to embodiments of the present invention may only use a small number of columns 350 (e.g., 3-6) to form each antenna beam 370, which columns are used varies based on a desired pointing direction of the antenna beam. As a result, it is necessary to calibrate the beamforming antenna across all of the columns 350 together. Thus, for example, for a twenty-four column version of the beamforming antennas according to embodiments of the present invention, the calibration network will calibrate across all twenty-four columns.

The small cell antennas according to embodiments of the present invention may exhibit numerous advantages. When the antennas are designed to operate as fixed-beam antennas they may provide high antenna gain and can be operated in 4×MIMO mode if desired. The antennas can be very compact, and may provide improved performance as compared to conventional antennas. When the antennas are operated as beamforming antennas, they can be operated so that each antenna beam formed by the antenna will have the same shape, gain, sidelobe and cross-polarization discrimination performance. This may advantageously simplify network planning for cellular operators. Moreover this can be achieved while always pointing the antenna beam almost at the user (e.g., within +/−10° of the user), which may ensure that the user will always receive nearly the peak antenna gain in the azimuth plane (e.g., within about 0-2 dB of the peak antenna gain). In some embodiments, the radios may also be configured to electronically scan the antenna beams to point in a desired direction in the azimuth plane.

Figure 1B:
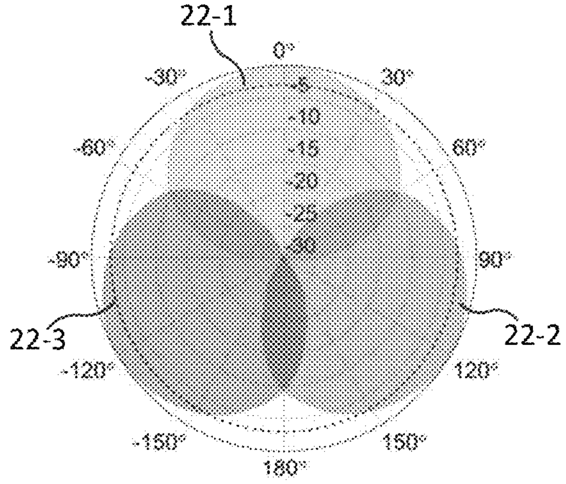
FIG. 1B (Prior Art)
FIG. 1B is a schematic diagram showing an azimuth cut of the three antenna beams generated by the base station antennas included in the small cell base station of FIG. 1A.
Figure 2:
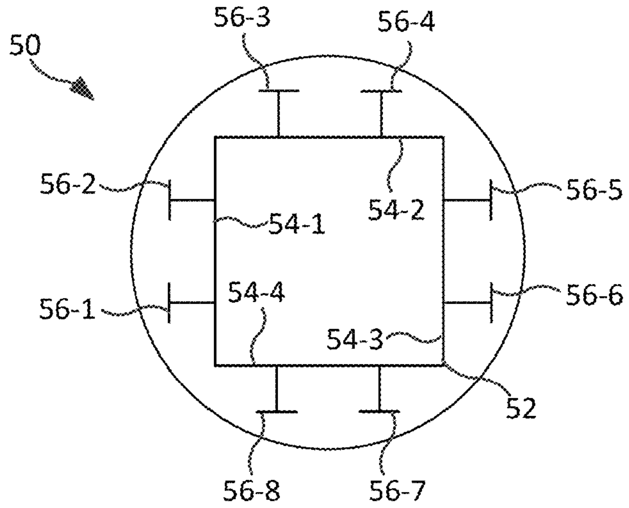
FIG. 2 (Prior Art)
FIG. 2 is a schematic top view of a conventional small cell base station antenna that provides omnidirectional coverage in the azimuth plane.

Additionally, most conventional small cell antennas use a single column or a multi-column planar array to generate the antenna beams. As can be seen with reference to FIG. 1B, this approach results in non-uniform coverage, with large areas having significantly lower gain than the areas that receive peak gain. For example, in FIG. 1B, there are three regions that each extend for about 35° in the azimuth plane (e.g., over 100° total) that have a gain that is at least 5 dB below peak gain, and a minimum gain that is about 10 dB below peak gain. The small cell antennas according to embodiments of the present invention include many more columns of radiating elements that are typically pointed in different directions. This approach results in much more uniform coverage, and hence can guarantee improved performance.

In still other cases, the antenna may operate as a beamforming antenna. This may increase the gain of the antenna, allowing for lower power transmissions which may reduce cost and reduce interference with other neighboring cells. Additionally, the beamforming capabilities may be used to reduce the gain of the antenna in the direction of interference sources.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as “under”, “below”, “lower”, “over”, “upper”, “top”, “bottom” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression “and/or” includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A base station antenna, comprising:

a plurality of pairs of radio frequency (“RF”) ports;

a tubular reflector;

a plurality of columns of first frequency band radiating elements that are mounted to extend outwardly from the tubular reflector, the columns extending around a periphery of the tubular reflector and grouped into a plurality of column groups, where each column group includes at least two columns;

a first feed network that connects both of the RF ports in a first of the plurality of pairs of RF ports to each column in a first of the column groups; and a second feed network that connects both of the RF ports in a second of the plurality of pairs of RF ports to each column in a second of the column groups;

wherein the plurality of column groups are configured to generate sector antenna beams that provide coverage to respective ones of a plurality of sectors.

2. The base station antenna of claim 1, wherein the tubular reflector includes a plurality of flat faces.

3. The base station antenna of claim 2, wherein each pair of adjacent flat faces define a respective angle within an interior of the tubular reflector, and the sum of the angles defined by the pairs of adjacent faces is equal to 360°.

4. The base station antenna of claim 1, wherein the column groups are arranged in pairs, and each pair of column groups is configured to be coupled to a respective one of a plurality of four-port radios.

5. The base station antenna of claim 4, wherein the first column group of each pair of column groups is configured to be coupled to first and second ports of the respective one of the four-port radios, and the second column group of each pair of column groups is configured to be coupled to third and fourth ports of the respective one of the four-port radios.

6. The base station antenna of claim 4 in combination with the plurality of four-port radios, wherein each four-port radio is configured to support four-input-four-output multi-input-multi-output (“MIMO”) communications through a respective pair of adjacent column groups.

7. The base station antenna of claim 1, wherein the plurality of columns of first frequency band radiating elements comprises at least twelve columns of first frequency band radiating elements.

8. The base station antenna of claim 1, wherein the plurality of columns of first frequency band radiating elements comprises eighteen columns of first frequency band radiating elements that are divided into six column groups having three columns of first frequency band radiating elements each, wherein each column group is configured to provide coverage to a 60° sector in an azimuth plane.

9. The base station antenna of claim 1, further comprising a plurality of radios that are mounted within a center of the tubular reflector.

10. The base station antenna of claim 9, wherein each radio includes a plurality of inwardly extending heat fins that are configured to contact a pole on which the base station antenna is mounted.

11. The base station antenna of claim 1, wherein each feed network includes first and second phase shifters for each column of first frequency band radiating elements, and wherein a single respective remote electronic tilt actuator is provided to adjust the phase shifters associated with the columns of first frequency band radiating elements included in each column group.

12. The base station antenna of claim 1, wherein the tubular reflector has a substantially circular cross-section.

13. The base station antenna of claim 1, wherein the plurality of columns of first frequency band radiating elements comprises twenty-four columns of first frequency band radiating elements that are divided into eight column groups having three columns of first frequency band radiating elements each, wherein each column group is configured to provide coverage to a 45° sector in an azimuth plane.

14. The base station antenna of claim 1, wherein adjacent columns are spaced apart by less than 0.6 of a wavelength that corresponds to a center frequency of the first frequency band.

* * * * *